Figure 1:
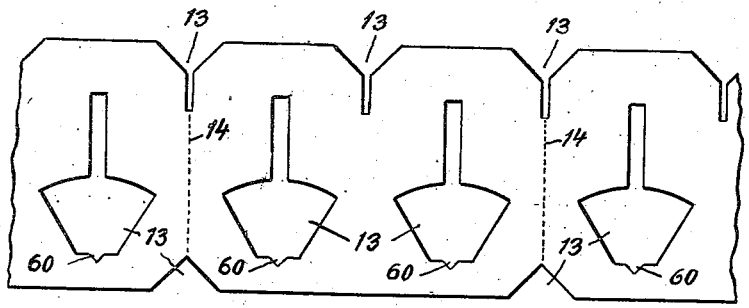

March 9, 1943. P. E. V. JACOBSEN 2,313,200
PROCESS AND APPARATUS FOR THE MANUFACTURE OF CARDBOARD
BOXES FOR PACKING OF EGGS, FRUIT, AND THE LIKE
Filed April 23, 1940 5 Sheets-Sheet 1

INVENTOR.
PETER EMIL VILHELM JACOBSEN
BY.
Richards & Geier
ATTORNEYS.

Fig. 3.

March 9, 1943. P. E. V. JACOBSEN 2,313,200
PROCESS AND APPARATUS FOR THE MANUFACTURE OF CARDBOARD
BOXES FOR PACKING OF EGGS, FRUIT, AND THE LIKE
Filed April 23, 1940  5 Sheets-Sheet 4

INVENTOR.
PETER EMIL VILHELM JACOBSEN
BY. *Richards a Geier*
ATTORNEYS.

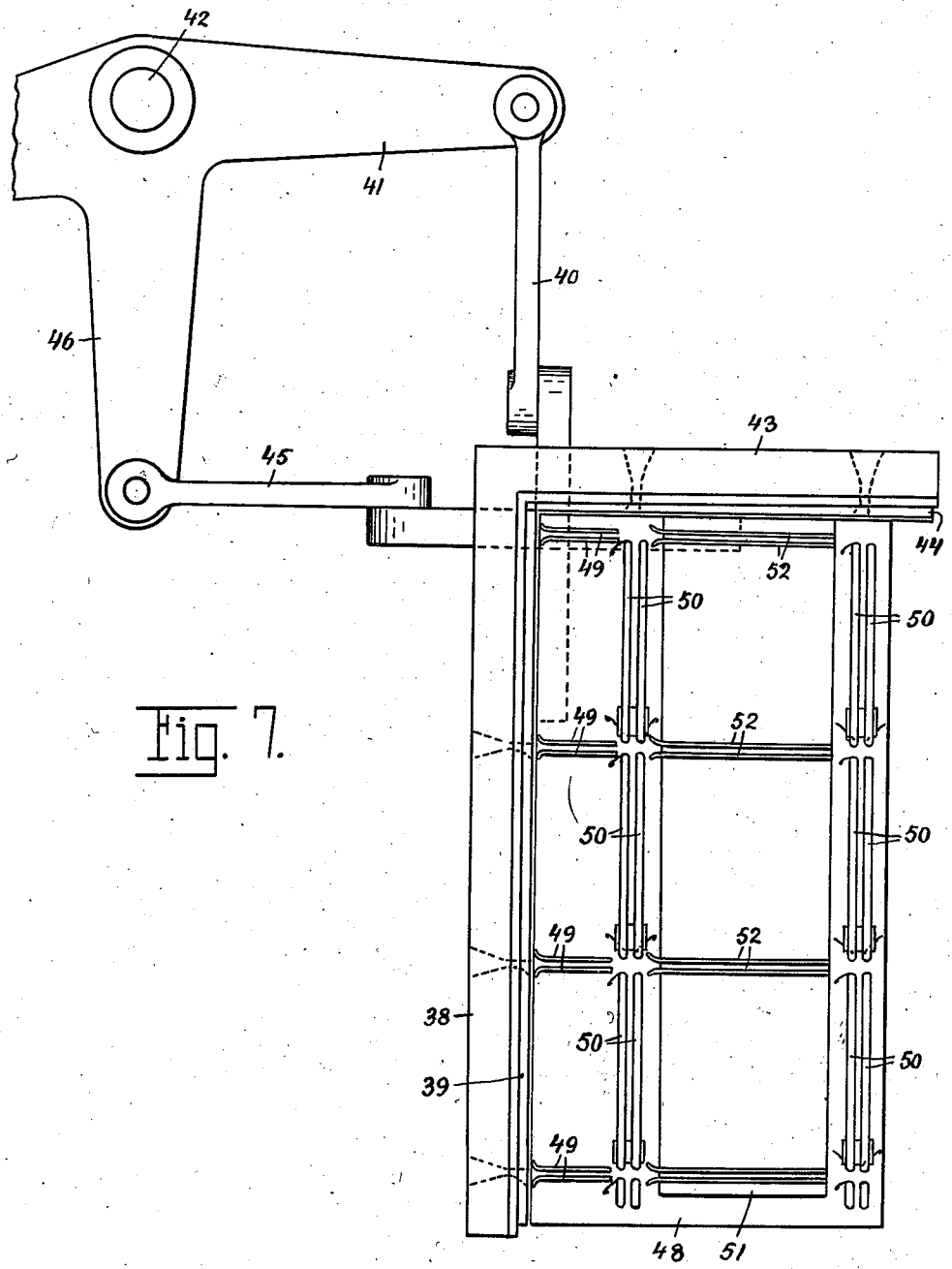

Patented Mar. 9, 1943

2,313,200

UNITED STATES PATENT OFFICE 2,313,200

PROCESS AND APPARATUS FOR THE MANUFACTURE OF CARDBOARD BOXES FOR PACKING OF EGGS, FRUIT, AND THE LIKE

Peter Emil Vilhelm Jacobsen, Copenhagen, Denmark; vested in the Alien Property Custodian Application April 23, 1940, Serial No. 331,131
In Denmark April 18, 1939

1 Claim. (Cl. 93—37)

It is known to manufacture egg boxes by means of machines, in such a manner that the boxes, immediately after the manufacture, can be used for packing of eggs. It is similarly known to manufacture the parts belonging to egg boxes separately on machines suited for the purpose, and then to ship the individual parts, either separated or more or less folded together, to the place at which the eggs are to be packed, and where the final assembling or unfolding of the folded egg box is effected.

The present invention relates to a process for the manufacture of such egg boxes which are composed of a number of longitudinal and transverse walls, the said longitudinal walls being folded together and pushed into closed incisions in the transverse walls, after which they are unfolded into V-shape, and the process consists in that the longitudinal and transverse walls of the egg boxes are first stamped out from strips of cardboard in the shape they are to have in their finished state, but in such a manner that they are mutually interconnected, after which the strips are coiled and transported to the place at which the cardboards are to be assembled and filled with eggs. The assembling is then effected here by means of a machine or an apparatus which unrolls the longitudinal and transverse walls from the said coils, and assembles the cardboards by bringing the walls into the proper mutual positions, and finally severs the walls from the cardboard strips.

By this special process the following advantages are attained: The stamping out of the walls can be effected on an automatically operating machine which receives a cardboard strip from a coil, stamps the same in such a manner that all material that does not enter into the finished egg box will be removed, and finally the strips are again wound into coils. In the case of the longitudinal walls of the egg box consisting, as mentioned above, of V-shaped troughs the two parts of which are interconnected along a line of bend, the said bending may also be effected by the stamping machine which produces a longitudinal weakening line at the centre of the strip, and then folds the two halves of the strip together, after which the machine produces the incisions in the folded walls, then unfolds the strip, and again winds the same into the shape of a coil. This gives the cheapest possible transport of the parts of the egg boxes, as only the quantity of material that enters into the finished egg boxes is transported, and the individual parts take up the smallest possible space, and are in a state that is especially adapted for transport, when they are wound firmly in the form of a coil. Further, the coiled strips are an especially convenient shape of materials to be supplied to the cutting and assembling apparatuses.

The apparatus that subsequently has to uncoil the coils and to assemble the egg boxes can be manufactured rather simply, because the incisions in the cardboard strips have already been made. The separation of the longitudinal and transverse walls from the cardboard strips is effected by shearing, in such a manner that no refuse is produced.

The invention is illustrated on the drawings, in which—

Figure 2:
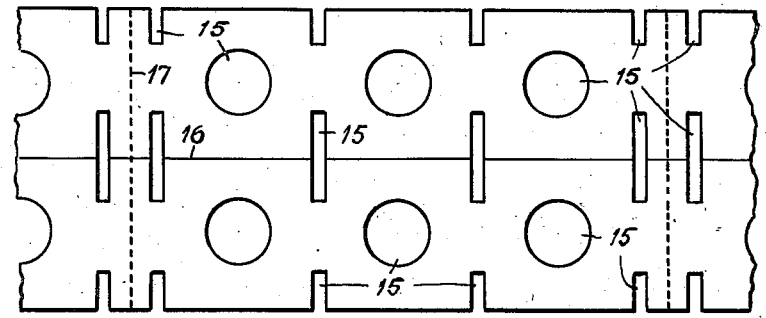
Figure 8:
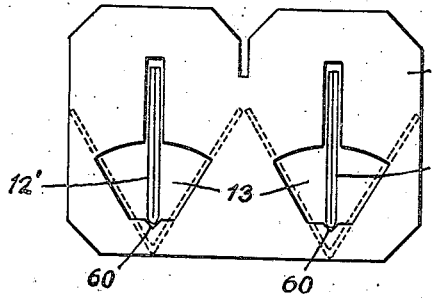
Figure 9:
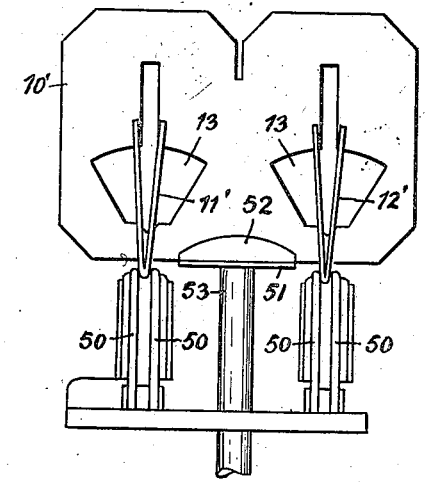
Figure 3:
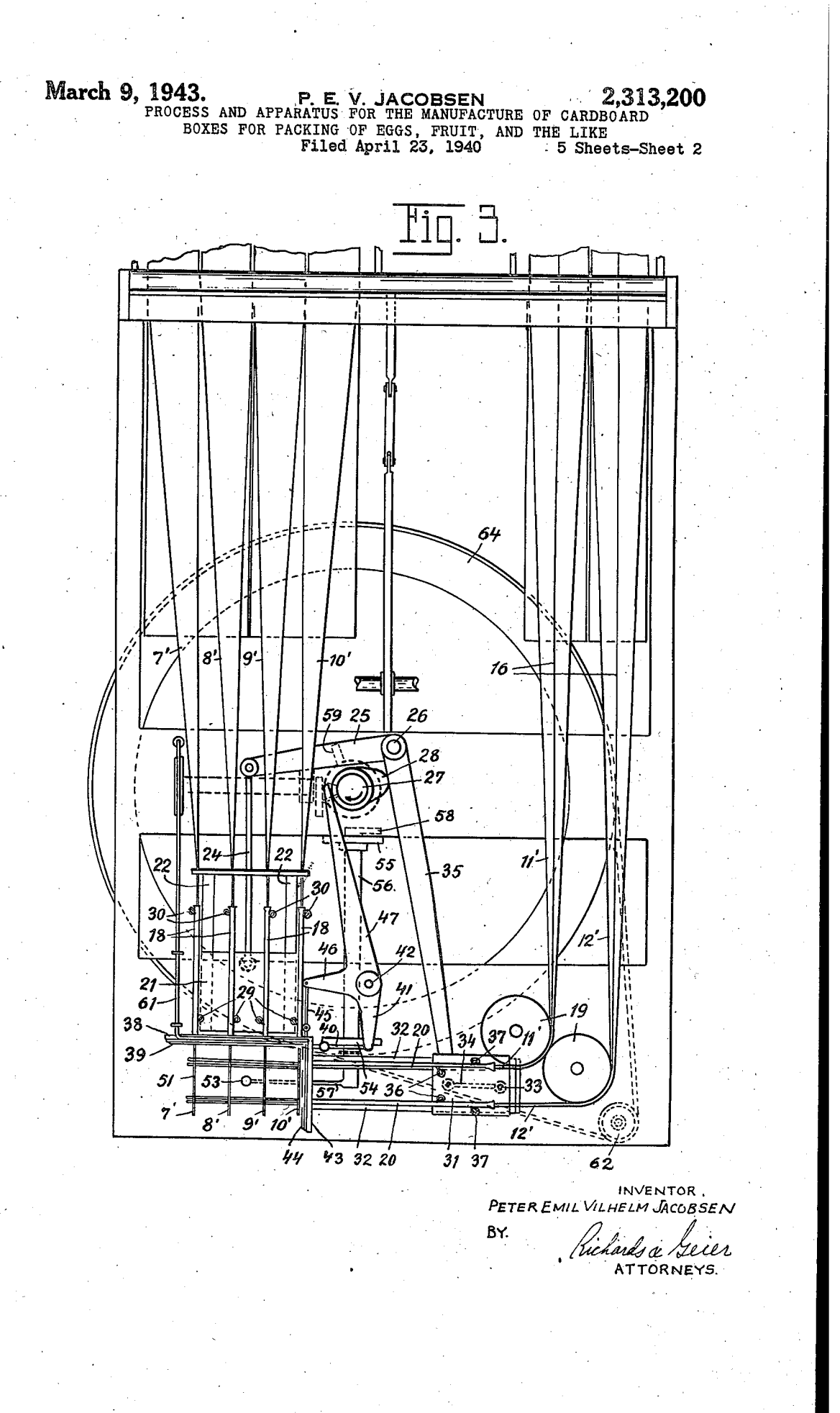
Figure 4:
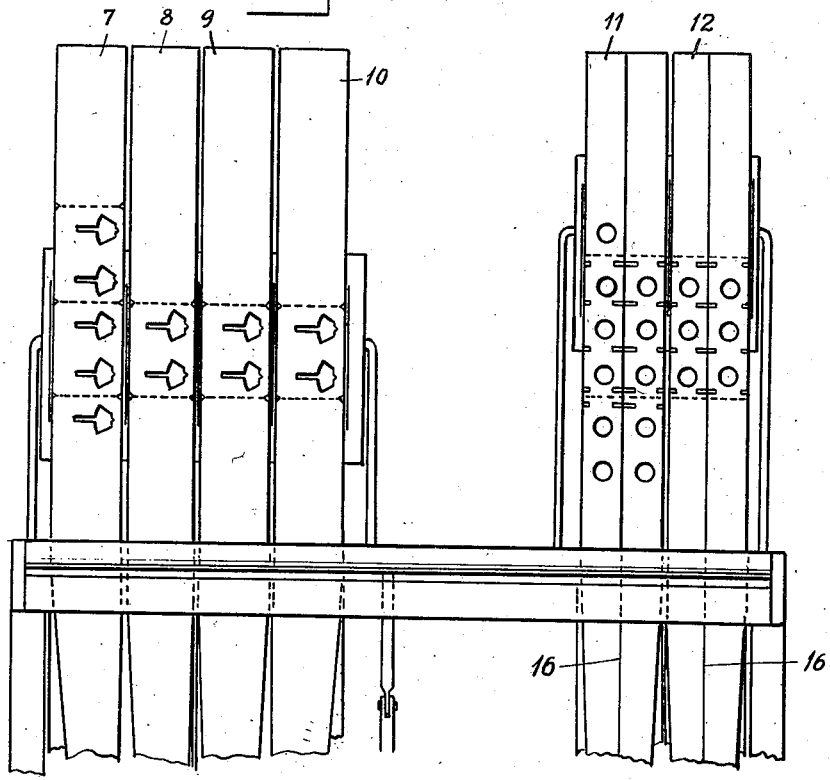
Figure 5:
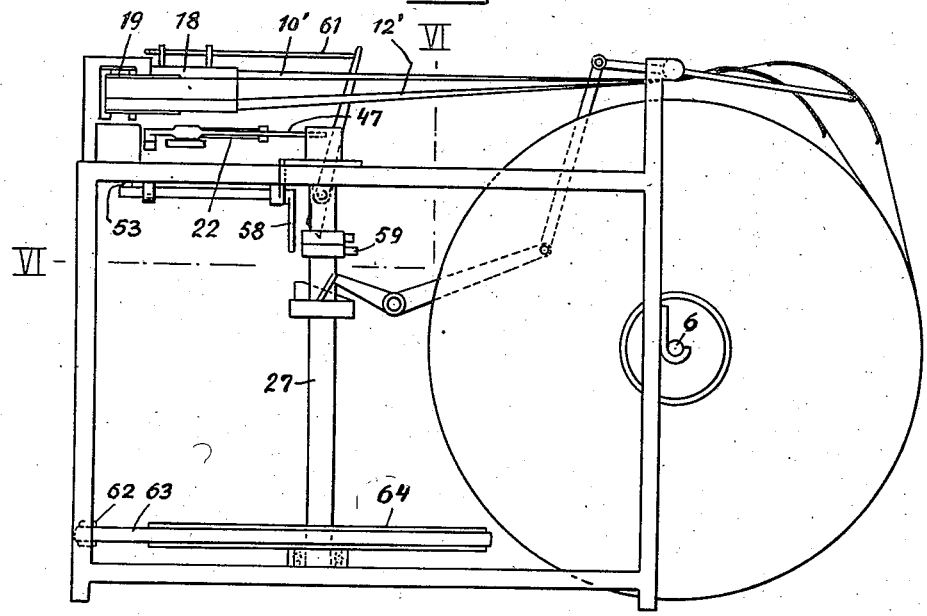
Figure 6:
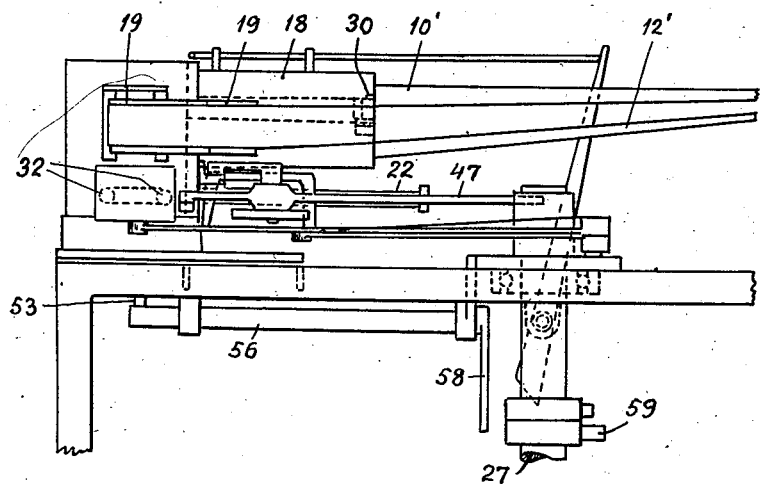

Figs. 1 and 2 show fractional parts of cardboard strips forming, respectively, the transverse walls and longitudinal walls of the finished egg box, Figs. 3 and 4 show two fragments of a construction of the apparatus for assembling the egg box, in plan view, Figs. 5 and 6 show two fragments of the same apparatus, in side elevation, Fig. 7 a detail from Fig. 3, to a larger scale, the so-called assembling box, Fig. 8 the egg box, in end elevation, immediately after the longitudinal walls have been brought into position, relatively to the transverse walls, but before they are unfolded, and Fig. 9 the egg box in the state of being lifted out from the assembling box.

On a horizontal shaft 6, Figs. 5 and 7, six coils 7, 8, 9, 10, 11, and 12 of cardboard strips are hung, the first four coils 7, 8, 9, and 10 consisting of stamped transverse walls for the egg box, and the last two coils 9 and 10 consisting of stamped longitudinal walls for the same. The cardboard strips forming the transverse walls, Fig. 1, have incisions 13, but the individual transverse walls are interconnected along imaginary dotted lines 14 which as described in the following are sheared off, at the same time as the individual egg boxes are assembled.

The cardboard strips forming the longitudinal walls, Fig. 2, have similarly incisions 15, and they have also a bend 16 along their centre line, which bend, however, is straightened out again, as during the stamping out of the openings 15 the strip has been folded together about the line 16. The individual longitudinal walls are separated from one another by imaginary dotted lines 17 along which the strips are sheared off, simultaneously with the assembling of the egg box.

In the construction shown, an egg box consists of four transverse walls taken from each of the four coils 7, 8, 9, and 10, and two longitudinal walls taken from each of the coils 11 and 12.

The cardboard strips from the coils 7, 8, 9, and 10 are marked with the numerals 7', 8', 9', and 10', respectively. They are turned edgewise and are each directed into a vertical double-walled stationary guide rail 18, in such a manner that they are standing side by side, at a mutual distance corresponding to incisions in the longitudinal walls, which in the present case are situated at a mutual distance from one another corresponding to the diameter of a hen's egg. The strips project on the other side of the guide rails 18, as shown in Fig. 3, for a distance corresponding exactly to the length of a transverse wall.

In Figs. 3 and 5 the strips from the coils 11 and 12 are marked with the numerals 11' and 12'. They are both folded together about the line of bend 16, at the same time as they are each moved along a guide roll 19, and they are then each directed into a corresponding vertical, double-walled stationary guide rail 20.

By the folding about the line 16, the cardboard strip is preferably bent in a direction opposite to the one in which it was bent in the stamping machine, as experience has shown that in this case it acquires a greater resiliency for opening or unfolding itself, when it is inserted into the finished egg box.

Below the guide rails 18, a carriage 21 is provided which is adapted to slide forward and back along stationary rails 22. The carriage 21 has a downward directed pin 23 which by means of a link bar 24 is connected to a lever 25 which is pivoted about a vertical pin 26. On a vertical shaft 27 in the machine, a lug 28 is provided which for each revolution of the shaft 27 actuates the lever 25, and thus moves the carriage 21 upward in Fig. 3 for a distance corresponding to the length of a transverse wall. When the lug 28 has moved past the lever 25, a spring not shown in the drawings returns the carriage 21 to the position shown in Fig. 3. The carriage 21 supports four spring-actuated pawls 29 which are in engagement with the incisions in the corresponding cardboard strips 7', 8', 9', and 10', and on the stationary guide rails 18 other spring-actuated pawls 30 are provided, which similarly are in engagement with the incisions in the corresponding strips 7', 8', 9', and 10'. When the carriage 21 is moved upwards in Fig. 3, the pawls 29 will slide over the incisions in the cardboard strips which are held in position by the pawls 30, and when the carriage 21 moves downwards, the pawls 29 take the cardboard strips along, and move them forward a distance corresponding to the length of a transverse wall.

In the same manner a movable carriage 31 is disposed below the guide rails 20 which carriage can slide along stationary rails 32. The carriage 31 is fitted on the bottom side with a downward directed pin 33 which by means of a link bar 34 is connected to a lever 35 which is pivoted about the pin 26, and is actuated by the lug 28 on the shaft 27, in the same manner as the lever 25 was actuated. The carriage 31 has two spring-actuated pawls 36 serving to convey the strips 11' and 12' forward, owing to the action of a spring that is not shown on the drawing, while another set of pawls 37 on the guide rails 20 serve to prevent the strips 11' and 12' from sliding backward. The forward motion of the strips 11' and 12' is thus effected according to the same principle as in the case of the strips 7', 8', 9' and 10'.

At the end of the guide rails 18, a matrix 38 is provided with openings through which the strips 7', 8', 9', and 10' are passing. Alongside the matrix, a cutter 39 is disposed which has four blades between which the strips are passing. By means of a link member 40, the cutter 39 is connected to a three-armed lever 41 which is pivoted about a stationary pin 42.

In the same manner a matrix 43 with two openings for the strips 11' and 12' is disposed at the end of the guide rails 20, and alongside the said matrix a cutter 44 is provided having two openings for the strips. The cutter 44 is connected, by means of a link bar 45, to one arm 46 of the lever 41, the third arm 47 of which is actuated by the lug 28 on the shaft 27. For each revolution of the latter the following will happen in succession: The strips 7', 8', 9', and 10' are moved forward a distance corresponding to the length of a transverse wall, after which the strips 11' and 12' are moved forward a distance corresponding to the length of a longitudinal wall, during which motion they are directed into incisions in the transverse walls, and finally the transverse as well as the longitudinal walls are severed from the strips concerned by means of the cutters 39 and 44.

Between the cutters 39 and 44, an assembling box is disposed which consists of a stationary table 48 fitted with guide rails 49 for the transverse walls and 50 for the longitudinal walls, in such a manner that all the walls are guided during their forward passage over the table 48. Between the two rows of guide rails 50 for the longitudinal walls, a plate 51 is provided on the table which plate supports relatively low guide rails 52 for the transverse walls, and this plate is supported by a vertical rod 53 which is adapted to slide up and down. As shown in Fig. 7, the plate 51 serves to lift the egg box from the assembling box, after the longitudinal walls have been moved into position, relatively to the transverse walls. In stationary bearings 54 and 55, Fig. 3, a horizontal shaft 56 is disposed which has an arm 57 by means of which it can lift the rod 53, and to the other end of the shaft an arm 58 is attached which swings sideways owing to the action of a lug 59 on the shaft 27, whereby the rod 53 is lifted, and again drops down, when the lug 59 has released the arm 58.

When the longitudinal walls 11' and 12' have been moved into position relatively to the transverse walls 7', 8', 9', and 10', they will occupy the position shown in Fig. 6. Then the rod 53 is raised to the position shown in Fig. 7, and by this motion also the transverse walls that rest in the guide rails 52 on the plate 5 are raised, while the longitudinal walls for a time are held back, and they are not raised until the bottoms of their vertical incisions are resting on the lower edge of the incisions 13 in the transverse walls, Fig. 8. Only in this position which is shown in Fig. 9, they are able to unfold themselves, and with their slit-like incisions they will then engage the transverse walls securely. In the bottoms of the incisions 13, Fig. 8, a notch 60 is provided which serves to maintain the longitudinal wall in its vertical position, immediately before it unfolds itself, in such a manner that it cannot come into a skew position, relatively to the incisions 13.

After the finished egg box in this manner has been raised from the assembling box, it is moved away from the apparatus by means of an arm 61 driven from the shaft 27.

The machine is driven by a crank handle or from the driving wheel 62 of a motor which wheel is connected, by means of a cord 63, to a cord pulley 64 on the shaft 27.

One of the advantages attained by the present invention is that the cardboard strips with incisions can be manufactured in paper factories or similar places, and then be shipped to egg-packers who assemble the egg boxes by means of the machine shown in Figs. 3 and 4. The transport and packing of the coiled cardboard strips is especially cheap, partly because no superfluous paper material is shipped that subsequently has to be cut away, and partly because the coiled cardboard strip merely requires a paper wrapper in order to be protected. The egg-packers do not require the stamping tools used for cutting the strips, and are not encumbered by the refuse resulting from the stampings.

The apparatus described may be used in other constructions than the one shown in the drawing.

I claim:

In an apparatus for folding cardboard boxes and the like made of a V-bent cardboard strip in which the longitudinal side walls and transverse walls are stamped out without severing the same therefrom, an assembling box, means for introducing said V-bent strip into said assembling box, said means comprising a pair of guide rails for holding said longitudinal walls, and separate guide means for holding said transverse walls, said last-mentioned guide means being actuated to line up said transverse walls in said assembling box, and said first-mentioned guide means being actuated to fold said longitudinal walls against the edges of said transverse walls.

PETER EMIL VILHELM JACOBSEN.